United States Patent
Kitagawa

(10) Patent No.: US 12,515,382 B2
(45) Date of Patent: Jan. 6, 2026

(54) PRODUCTION METHOD FOR DIP-MOLDED ARTICLE

(71) Applicant: ZEON CORPORATION, Tokyo (JP)

(72) Inventor: Masaru Kitagawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 924 days.

(21) Appl. No.: 16/968,821

(22) PCT Filed: Feb. 6, 2019

(86) PCT No.: PCT/JP2019/004198
§ 371 (c)(1),
(2) Date: Aug. 10, 2020

(87) PCT Pub. No.: WO2019/159779
PCT Pub. Date: Aug. 22, 2019

(65) Prior Publication Data
US 2021/0001521 A1    Jan. 7, 2021

(30) Foreign Application Priority Data
Feb. 16, 2018  (JP) .................. 2018-026242

(51) Int. Cl.
| | |
|---|---|
| B29C 41/00 | (2006.01) |
| B29C 41/14 | (2006.01) |
| B29C 41/42 | (2006.01) |
| B29C 41/46 | (2006.01) |
| B29K 9/00 | (2006.01) |
| B29K 105/00 | (2006.01) |
| C08K 3/22 | (2006.01) |
| C08L 13/02 | (2006.01) |

(52) U.S. Cl.
CPC ............ *B29C 41/003* (2013.01); *B29C 41/14* (2013.01); *B29C 41/42* (2013.01); *B29C 41/46* (2013.01); *C08K 3/22* (2013.01); *C08L 13/02* (2013.01); *B29K 2009/00* (2013.01); *B29K 2105/0064* (2013.01); *C08K 2003/2227* (2013.01); *C08L 2201/52* (2013.01)

(58) Field of Classification Search
CPC ....... B29C 41/003; B29C 41/14; B29C 41/42; B29C 41/46; B29C 41/52; C08K 3/22; C08K 2003/2227; C08K 3/105; C08K 3/10; C08L 13/02; C08L 2201/52; B29K 2009/00; B29K 2105/0064; B29K 2007/00; C08J 5/02; C08J 2313/02; C08F 236/12; B29L 2031/4864
See application file for complete search history.

(56) References Cited

U.S. PATENT DOCUMENTS

| | | | |
|---|---|---|---|
| 2002/0101007 A1* | 8/2002 | Koide ................. | B29C 41/42 |
| | | | 264/301 |
| 2005/0080223 A1* | 4/2005 | Tuominen ............ | C09D 167/00 |
| | | | 528/272 |
| 2006/0253956 A1 | 11/2006 | Lipinski | |
| 2006/0257674 A1 | 11/2006 | Lipinski et al. | |
| 2008/0207809 A1 | 8/2008 | Koide | |
| 2008/0227913 A1 | 9/2008 | Koide | |
| 2009/0157027 A1* | 6/2009 | Kamphus ............... | A61L 15/26 |
| | | | 604/367 |
| 2011/0287254 A1 | 11/2011 | Lipinski | |
| 2012/0028048 A1 | 2/2012 | Foo | |
| 2012/0137404 A1 | 6/2012 | Lipinski | |
| 2012/0291180 A1 | 11/2012 | Lipinski | |
| 2013/0276208 A1 | 10/2013 | Lipnski | |
| 2013/0283499 A1* | 10/2013 | Chou ..................... | B29C 41/14 |
| | | | 2/169 |
| 2014/0206903 A1* | 7/2014 | Huang ................... | A61K 47/54 |
| | | | 564/301 |
| 2015/0273519 A1 | 10/2015 | Foo | |
| 2015/0307510 A1* | 10/2015 | Hagberg ............... | C07D 493/04 |
| | | | 514/470 |
| 2016/0053095 A1 | 2/2016 | Lipinski | |
| 2016/0263783 A1 | 9/2016 | Foo | |
| 2017/0274566 A1 | 9/2017 | Foo | |
| 2019/0010271 A1 | 1/2019 | Kodemura et al. | |

FOREIGN PATENT DOCUMENTS

| | | | | |
|---|---|---|---|---|
| CN | 102387911 A | 3/2012 | | |
| EP | 1 209 186 A1 | 5/2002 | | |
| EP | 3 753 981 A1 | 12/2020 | | |
| EP | 3 816 222 A1 | 5/2021 | | |
| JP | 2010-59441 A | 3/2010 | | |
| JP | 5697578 B2 | 4/2015 | | |
| TW | 201615109 A | 5/2016 | | |
| WO | 00/73367 A1 | 12/2000 | | |
| WO | WO-2016047418 A1 * | 3/2016 | ............ | B29C 41/14 |
| WO | 2016/072835 A1 | 5/2016 | | |
| WO | WO-2017006385 A1 * | 1/2017 | | |
| WO | 2017/130889 A1 | 8/2017 | | |

OTHER PUBLICATIONS

Sugar Alcohol (Yale New Haven Health), https://www.ynhh.org/services/nutrition/sugar-alcohol, accessed Feb. 27, 2024 (Year: 2021).*

(Continued)

*Primary Examiner* — S. Behrooz Ghorishi
(74) *Attorney, Agent, or Firm* — Oliff PLC

(57) ABSTRACT

A method for producing a dip-molded article, including a dip-molding step of dip-molding a latex composition containing a latex of a carboxyl group-containing conjugated diene-based rubber (A) and a water-soluble metal compound (B) using a dip mold to form a dip-molded layer on the surface of the dip mold; a moisture content adjustment step of adjusting the moisture content of the dip-molded layer formed on the surface of the dip mold to 1 to 30 wt %; and a beading step of performing beading after the adjusting of the moisture content, the beading including peeling a portion of the dip-molded layer formed on the surface of the dip mold from the dip mold.

15 Claims, No Drawings

(56) References Cited

OTHER PUBLICATIONS

Apr. 9, 2019 Search Report issued in International Patent Application No. PCT/JP2019/004198.
Aug. 18, 2020 International Preliminary Report on Patentability issued in International Patent Application No. PCT/JP2019/004198.
Oct. 6, 2021 Extended European Search Report issued in European Patent Application No. 19753691.5.
Jun. 3, 2024 Office Action issued in European Patent Application No. 19753691.5.

* cited by examiner

PRODUCTION METHOD FOR DIP-MOLDED ARTICLE

TECHNICAL FIELD

The present invention relates to a method for producing a dip-molded article. More specifically, the present invention relates to a method for producing a dip-molded article which can avoid delayed (Type IV) allergic reactions in addition to immediate (Type I) allergic reactions, and barely fails beading/rolling.

BACKGROUND ART

Conventionally, it has been known that dip-molded articles (e.g., teats, air balls, gloves, balloons, and stalls) for use in contact with the human body can be produced by dip-molding a latex composition containing natural latex represented by a natural rubber latex. However, in some cases, such dip-molded articles are not suitable for use in direct contact with the mucosa or organs of a living body because the natural rubber latex contains proteins that may cause immediate (Type I) allergic reactions in the human body. In response to this problem, the use of a synthetic nitrile rubber latex such as a nitrile rubber has been studied.

For example, Patent Document 1 discloses a latex composition obtainable by mixing zinc oxide, sulfur, and a vulcanization accelerator with an emulsion which contains a carboxylated nitrile butadiene random terpolymer containing acrylonitrile, a carboxylic acid, and butadiene and has a total solids content of 15 to 25 wt %. Unfortunately, although the technique of Patent Document 1 can prevent immediate (Type I) allergic reactions, dip-molded articles obtained using this technique may cause delayed (Type IV) allergic reactions due to sulfur and the vulcanization accelerator contained in the dip-molded articles in some cases when these substances touch the human body.

As a technique to overcome this issue, for example, Patent Document 2 discloses a use of a mixture of a trivalent metal or a trivalent metal compound as a cross-linking agent, a specific polyethylene glycol or a polyethylene glycol derivative, and a specific hydroxide salt to prepare a latex composition containing at least one base polymer, a cross-linking agent, and a pH modifier. Since the technique disclosed in Patent Document 2 does not involve sulfur and any sulfur compounds (vulcanization accelerators), not only immediate (Type I) allergic reactions but also delayed (Type IV) allergic reactions can be prevented.

RELATED ART

Patent Document

Patent Document 1: Japanese Patent No. 5697578
Patent Document 2: International Publication No. WO 2016/72835

SUMMARY OF THE INVENTION

Problem to be Solved by the Invention

A general method for producing a molded film such as a dip-molded article by dip-molding involves performing beading (cuff rolling) on a cuff portion of a dip-molded layer famed on a dip mold before removal from the dip mold to form a demolding tab. In particular, such a beading process is preferably performed on dip-molded articles for gloves to provide products which are resistant to tearing during use and are easy to put on. In view of such circumstances, the present inventor has made an examination and found that although the technique of Patent Document 2 can prevent delayed (Type IV) allergic reactions as well as immediate (Type I) allergic reactions, unfortunately, the resulting dip-molded article may be torn during beading or the resulting dip-molded layer may adhere to a dip mold so strongly that the beading/rolling operation cannot be completed.

The present invention has been devised in response to the above issues, and an object thereof is to provide a method for producing a dip-molded article which can avoid delayed (Type IV) allergic reactions in addition to immediate (Type I) allergic reactions, and barely fails beading/rolling.

Means for Solving the Problem

As a result of dedicated research to achieve the above object, the present inventor has found that the above object can be achieved by a production process for producing a dip-molded article using a latex composition containing a latex of a carboxyl group-containing conjugated diene-based rubber (A) and a water-soluble metal compound (B), the process comprising performing beading in which a portion of a dip-molded layer famed on the surface of a dip mold is peeled from the dip mold in a state where the moisture content of the dip-molded layer is controlled to 1 to 30 wt %. This finding has led to the completion of the present invention.

Specifically, the present invention provides a method for producing a dip-molded article, comprising:
  a dip-molding step of dip-molding a latex composition containing a latex of a carboxyl group-containing conjugated diene-based rubber (A) and a water-soluble metal compound (B) using a dip mold to form a dip-molded layer on the surface of the dip mold;
  a moisture content adjustment step of adjusting the moisture content of the dip-molded layer famed on the surface of the dip mold to 1 to 30 wt %; and
  a beading step of performing beading after the adjusting of the moisture content, the beading including peeling a portion of the dip-molded layer famed on the surface of the dip mold from the dip mold.

The production method according to the present invention preferably further comprises:
  a cross-linking step of cross-linking the dip-molded layer after the beading; and
  a demolding step of removing the cross-linked dip-molded layer from the dip mold.

In the production method according to the present invention, the moisture content adjustment step preferably includes a step of heating the dip-molded layer famed on the surface of the dip mold at 20 to 100° C. for 1 to 20 minutes.

In the production method according to the present invention, the moisture content adjustment step preferably includes a step of heating the dip-molded layer famed on the surface of the dip mold at 40 to 80° C. for 1 to 20 minutes.

In the production method according the present invention, the metal compound (B) is preferably an aluminum compound.

Effects of Invention

The present invention can provide a method for producing a dip-molded article which can avoid delayed (Type IV)

allergic reactions in addition to immediate (Type I) allergic reactions, and barely fails beading/rolling.

DESCRIPTION OF EMBODIMENTS

The method for producing a dip-molded article according to the present invention comprises:
a dip-molding step of dip-molding a latex composition containing a latex of a carboxyl group-containing conjugated diene-based rubber (A) and a water-soluble metal compound (B) using a dip mold to form a dip-molded layer on the surface of the dip mold;
a moisture content adjustment step of adjusting the moisture content of the dip-molded layer famed on the surface of the dip mold to 1 to 30 wt %; and
a beading step of performing beading after the adjusting of the moisture content, the beading including peeling a portion of the dip-molded layer formed on the surface of the dip mold from the dip mold.

<Latex Composition>

The following description begins with the description of a latex composition used in the production method according to the present invention.

The latex composition used in the production method according to the present invention contains a latex of a carboxyl group-containing conjugated diene-based rubber (A) and a water-soluble metal compound (B).

The latex of the carboxyl group-containing conjugated diene-based rubber (A) used in the present invention is a latex of a copolymer obtained by copolymerizing a monomer mixture containing at least a conjugated diene monomer and an ethylenically unsaturated carboxylic acid monomer. The carboxyl group-containing conjugated diene-based rubber (A) is preferably at least one selected from a carboxyl group-containing nitrile rubber (a1), a carboxyl group-containing styrene-butadiene rubber (a2), and a carboxyl group-containing conjugated diene rubber (a3).

A latex of the carboxyl group-containing nitrile rubber (a1) is a latex of a copolymer obtained by copolymerizing an ethylenically unsaturated nitrile monomer with the conjugated diene monomer and the ethylenically unsaturated carboxylic acid monomer, and may be a latex of a copolymer obtained by copolymerizing these monomers optionally with other ethylenically unsaturated monomers copolymerizable with the monomers.

Examples of the conjugated diene monomer include 1,3-butadiene, isoprene, 2,3-dimethyl-1,3-butadiene, 2-ethyl-1,3-butadiene, 1,3-pentadiene, chloroprene, and the like. Among these, preferred are 1,3-butadiene and isoprene, and more preferred is 1,3-butadiene. These conjugated diene monomers may be used alone or in combination. The proportion of conjugated diene monomer units formed by the conjugated diene monomer in the carboxyl group-containing nitrile rubber (a1) is preferably 56 to 78 wt %, more preferably 56 to 73 wt %, still more preferably 56 to 68 wt %. Control of the proportion of conjugated diene monomer units within the above ranges results in a molded film such as a dip-molded article which has sufficient tensile strength and has an excellent texture and excellent elongation at the same time.

The ethylenically unsaturated carboxylic acid monomer may be any ethylenically unsaturated monomer having a carboxyl group. Examples thereof include, but are not limited to, ethylenically unsaturated monocarboxylic acids such as acrylic acid and methacrylic acid; ethylenically unsaturated polyvalent carboxylic acids such as itaconic acid, maleic acid, and fumaric acid; ethylenically unsaturated polyvalent carboxylic acid anhydrides such as maleic anhydride and citraconic anhydride; ethylenically unsaturated polycarboxylic acid partial ester monomers such as monobutyl fumarate, monobutyl malate, and mono-2-hydroxypropyl maleate; and the like. Among these, preferred are ethylenically unsaturated monocarboxylic acids, and particularly preferred is methacrylic acid. These ethylenically unsaturated carboxylic acid monomers may be used in the form of an alkali metal salt or an ammonium salt. Further, these ethylenically unsaturated carboxylic acid monomers may be used alone or in combination. The proportion of ethylenically unsaturated carboxylic acid monomer units famed by the ethylenically unsaturated carboxylic acid monomer in the carboxyl group-containing nitrile rubber (a1) is preferably 2 to 5 wt %, more preferably 2 to 4.5 wt %, still more preferably 2.5 to 4.5 wt %. Control of the proportion of ethylenically unsaturated carboxylic acid monomer units within the above ranges results in a molded film such as a dip-molded article which has sufficient tensile strength and has an excellent texture and excellent elongation at the same time.

The ethylenically unsaturated nitrile monomer may be any ethylenically unsaturated monomer having a nitrile group. Examples thereof include, but are not limited to, acrylonitrile, methacrylonitrile, fumaronitrile, α-chloroacrylonitrile, α-cyanoethylacrylonitrile, and the like. Among these, preferred are acrylonitrile and methacrylonitrile, and more preferred is acrylonitrile. These ethylenically unsaturated nitrile monomers may be used alone or in combination. The proportion of ethylenically unsaturated nitrile monomer units famed by the ethylenically unsaturated nitrile monomer in the carboxyl group-containing nitrile rubber (a1) is preferably 20 to 40 wt %, more preferably 25 to 40 wt %, still more preferably 30 to 40 wt %. Control of the proportion of ethylenically unsaturated nitrile monomer units within the above ranges results in a molded film such as a dip-molded article which has sufficient tensile strength and has an excellent texture and excellent elongation at the same time.

Examples of the other ethylenically unsaturated monomers copolymerizable with the conjugated diene monomer, the ethylenically unsaturated carboxylic acid monomer, and the ethylenically unsaturated nitrile monomer include vinyl aromatic monomers such as styrene, alkylstyrenes, and vinylnaphthalene; fluoroalkyl vinyl ethers such as fluoroethyl vinyl ether; ethylenically unsaturated amide monomers such as (meth)acrylamide, N-methylol(meth)acrylamide, N,N-dimethylol(meth)acrylamide, N-methoxymethyl(meth)acrylamide, and N-propoxymethyl(meth)acrylamide; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth)acrylate; cross-linkable monomers such as divinylbenzene, polyethylene glycol di(meth)acrylate, polypropylene glycol di(meth)acrylate, trimethylolpropane tri(meth)acrylate, and pentaerythritol (meth)acrylate; and the like. These ethylenically unsaturated monomers may be used alone or in combination.

The proportion of other monomer units famed by the other ethylenically unsaturated monomers in the carboxyl group-containing nitrile rubber (a1) is preferably 10 wt % or less, more preferably 5 wt % or less, still more preferably 3 wt % or less.

The latex of the carboxyl group-containing nitrile rubber (a1) used in the present invention can be obtained by copolymerizing a monomer mixture containing the above-mentioned monomers, and the monomers are preferably copolymerized by emulsion polymerization. As an emulsion polymerization method, a conventionally known method can be employed.

During emulsion polymerization of the monomer mixture containing the above-mentioned monomers, ordinarily used polymerization additives, such as an emulsifier, a polymerization initiator, and a molecular weight modifier, can be used. These polymerization additives may be added in any manner, and any of initial single addition, portion-wise addition, continuous addition, and the like may be used.

Examples of the emulsifier include, but are not limited to, nonionic emulsifiers such as polyoxyethylene alkyl ethers, polyoxyethylene alkylphenol ethers, polyoxyethylene alkyl esters, and polyoxyethylene sorbitan alkyl esters; anionic emulsifiers such as alkylbenzenesulfonic acid salts including potassium dodecylbenzenesulfonate and sodium dodecylbenzenesulfonate, higher alcohol sulfuric acid ester salts, and alkylsulfosuccinic acid salts; cationic emulsifiers such as alkyltrimethylammonium chlorides, dialkylammonium chlorides, and benzylammonium chloride; copolymerizable emulsifiers such as sulfoesters of $\alpha,\beta$-unsaturated carboxylic acids, sulfate esters of $\alpha,\beta$-unsaturated carboxylic acids, and sulfoalkylaryl ethers; and the like. Among these, anionic emulsifiers are preferred, alkylbenzenesulfonic acid salts are more preferred, and potassium dodecylbenzenesulfonate and sodium dodecylbenzenesulfonate are particularly preferred. These emulsifiers may be used alone or in combination. The amount of the emulsifier to be used is preferably 0.1 to 10 parts by weight relative to 100 parts by weight of the monomer mixture.

Examples of the polymerization initiator include, but are not limited to, inorganic peroxides such as sodium persulfate, potassium persulfate, ammonium persulfate, potassium perphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-$\alpha$-cumyl peroxide, acetyl peroxide, isobutyryl peroxide, and benzoyl peroxide; azo compounds such as azobisisobutyronitrile, azobis-2,4-dimethylvaleronitrile, and methyl azobisisobutyrate; and the like. These polymerization initiators may be used alone or in combination. The amount of the polymerization initiator to be used is preferably 0.01 to 10 parts by weight, more preferably 0.01 to 2 parts by weight relative to 100 parts by weight of the monomer mixture.

In addition, a combination of a peroxide initiator with a reducing agent can be used as a redox polymerization initiator. Examples of such reducing agents include, but are not limited to, compounds containing a metal ion in a reduced state such as ferrous sulfate and cuprous naphthenate; sulfonic acid compounds such as sodium methanesulfonate; amine compounds such as dimethylaniline; and the like. These reducing agents may be used alone or in combination. The amount of the reducing agent to be used is preferably 3 to 1000 parts by weight relative to 100 parts by weight of the peroxide.

The amount of water to be used during emulsion polymerization is preferably 80 to 600 parts by weight, particularly preferably 100 to 200 parts by weight relative to 100 parts by weight of the total monomers used.

Examples of methods for adding monomers include a method of adding the monomers in a reactor at a time, a method of continuously or intermittently adding the monomers according to the progress of polymerization, a method in which the reaction is carried out up to a specific conversion ratio by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed. Further, the monomers used may be mixed and then added to the reactor, or each monomer may be individually added to the reactor.

Further, polymerization additives, such as a chelating agent, a dispersing agent, a pH modifier, a deoxidizing agent, and a particle size adjusting agent, can be optionally used. The types and the amounts to be used of such polymerization additives are not particularly limited.

The polymerization temperature during emulsion polymerization is typically 3 to 95° C., preferably 5 to 60° C., although not particularly limited thereto. The polymerization time is about 5 to 40 hours.

When the monomers are emulsion polymerized as described above to a predetermined polymerization conversion ratio, the polymerization reaction is stopped by cooling the polymerization system or by adding a polymerization terminator. The polymerization conversion ratio at which the polymerization reaction is stopped is typically 90 wt % or more, more preferably 93 wt % or more.

Examples of the polymerization terminator include, but are not limited to, hydroxylamine, hydroxylamine sulfate, diethylhydroxylamine, hydroxyamine sulfonic acid and alkali metal salts thereof, sodium dimethyldithiocarbamate, hydroquinone derivatives, catechol derivatives, aromatic hydroxydithiocarboxylic acids (e.g., hydroxydimethylbenzenethiocarboxylic acid, hydroxydiethylbenzenedithiocarboxylic acid, and hydroxydibutylbenzenedithiocarboxylic acid) and alkali metal salts thereof, and the like. The amount of the polymerization terminator to be used is preferably 0.05 to 2 parts by weight relative to 100 parts by weight of the monomer mixture.

After stopping the polymerization reaction, if desired, unreacted monomers may be removed, and the solids content and the pH may be adjusted. Thus, the latex of the carboxyl group-containing nitrile rubber (a1) can be obtained.

An anti-aging agent, a preservative, an antibacterial agent, a dispersing agent, and the like may be optionally added to the latex of the carboxyl group-containing nitrile rubber (a1) used in the present invention.

The number average particle size of the latex of the carboxyl group-containing nitrile rubber (a1) used in the present invention is preferably 60 to 300 nm, more preferably 80 to 150 nm. The particle size can be adjusted to a desired value, for example, by selecting the amounts of emulsifier and polymerization initiator to be used.

A latex of the carboxylic group-containing styrene-butadiene rubber (a2) used in the present invention is a latex of a copolymer obtained by copolymerizing styrene with 1,3-butadiene as the conjugated diene monomer and the ethylenically unsaturated carboxylic acid monomer, and may be a latex of a copolymer obtained by copolymerizing these monomers optionally with other ethylenically unsaturated monomers copolymerizable with the monomers.

The proportion of butadiene units formed by 1,3-butadiene in the carboxyl group-containing styrene-butadiene rubber (a2) is preferably 56 to 78 wt %, more preferably 56 to 73 wt %, still more preferably 56 to 68 wt %. Control of the proportion of butadiene units within the above ranges results in a molded film such as a dip-molded article which has sufficient tensile strength and has an excellent texture and excellent elongation at the same time.

The ethylenically unsaturated carboxylic acid monomer may be any ethylenically unsaturated monomer having a carboxyl group. Examples thereof that can be used include, but are not limited to, the same monomers as those mentioned above for the latex of the carboxyl group-containing nitrile rubber (a1). The proportion of ethylenically unsaturated carboxylic acid monomer units famed by the ethylenically unsaturated carboxylic acid monomer in the carboxyl group-containing styrene-butadiene rubber (a2) is preferably 2 to 5 wt %, more preferably 2 to 4.5 wt %, still more preferably 2.5 to 4.5 wt %. Control of the proportion of ethylenically unsaturated carboxylic acid monomer units within the above ranges results in a molded film such as a dip-molded article which has sufficient tensile strength and has an excellent texture and excellent elongation at the same time.

The proportion of styrene units famed by styrene in the carboxyl group-containing styrene-butadiene rubber (a2) is preferably 20 to 40 wt %, more preferably 25 to 40 wt %, still more preferably 30 to 40 wt %. Control of the proportion of styrene units within the above ranges results in a molded film such as a dip-molded article which has sufficient tensile strength and has an excellent texture and excellent elongation at the same time.

Examples of the other ethylenically unsaturated monomers copolymerizable with 1,3-butadiene as the conjugated diene monomer, the ethylenically unsaturated carboxylic acid monomer, and styrene include the same monomers (except styrene) as those mentioned above for the latex of the carboxyl group-containing nitrile rubber (a1). Other examples include conjugated diene monomers other than 1,3-butadiene, such as isoprene, 2,3-dimethyl-1,3-butadiene, 2-ethyl-1,3-butadiene, 1,3-pentadiene, and chloroprene, and the like. The proportion of other monomer units famed by the other ethylenically unsaturated monomers in the carboxyl group-containing styrene-butadiene rubber (a2) is preferably 10 wt % or less, more preferably 5 wt % or less, still more preferably 3 wt % or less.

The latex of the carboxyl group-containing styrene-butadiene rubber (a2) used in the present invention can be obtained by copolymerizing a monomer mixture containing the above-mentioned monomers, and the monomers are preferably copolymerized by emulsion polymerization. The same emulsion polymerization method as that for the carboxyl group-containing nitrile rubber (a1) may be carried out using the same polymerization additives as those for the carboxyl group-containing nitrile rubber (a1).

An anti-aging agent, a preservative, an antibacterial agent, a dispersing agent, and the like may be optionally added to the latex of the carboxyl group-containing styrene-butadiene rubber (a2) used in the present invention.

The number average particle size of the latex of the carboxyl group-containing styrene-butadiene rubber (a2) used in the present invention is preferably 60 to 300 nm, more preferably 80 to 150 nm. The particle size can be adjusted to a desired value, for example, by selecting the amounts of emulsifier and polymerization initiator to be used.

A latex of the carboxylic group-containing conjugated diene rubber (a3) used in the present invention is a latex of a copolymer obtained by copolymerizing the conjugated diene monomer and the ethylenically unsaturated carboxylic acid monomer, and may be a latex of a copolymer obtained by copolymerizing these monomers optionally with other ethylenically unsaturated monomers copolymerizable with the monomers.

The proportion of conjugated diene monomer units formed by the conjugated diene monomer in the carboxyl group-containing conjugated diene rubber (a3) is preferably 80 to 98 wt %, more preferably 90 to 98 wt %, still more preferably 95 to 97.5 wt %. Control of the proportion of conjugated diene monomer units within the above ranges results in a molded film such as a dip-molded article which has sufficient tensile strength and has an excellent texture and excellent elongation at the same time.

The ethylenically unsaturated carboxylic acid monomer may be any ethylenically unsaturated monomer having a carboxyl group. Examples thereof that can be used include, but are not limited to, the same monomers as those mentioned above for the latex of the carboxyl group-containing nitrile rubber (a1). The proportion of ethylenically unsaturated carboxylic acid monomer units famed by the ethylenically unsaturated carboxylic acid monomer in the carboxyl group-containing conjugated diene rubber (a3) is preferably 2 to 10 wt %, more preferably 2 to 7.5 wt %, still preferably 2.5 to 5 wt %. Control of the proportion of ethylenically unsaturated carboxylic acid monomer units within the above ranges results in a molded film such as a dip-molded article which has sufficient tensile strength and has an excellent texture and excellent elongation at the same time.

Examples of the conjugated diene monomer include 1,3-butadiene, isoprene, 2,3-dimethyl-1,3-butadiene, 2-ethyl-1,3-butadiene, 1,3-pentadiene, chloroprene, and the like. The conjugated diene monomer may include only one of these or may include a combination thereof.

Examples of the other ethylenically unsaturated monomers copolymerizable with the conjugated diene monomer and the ethylenically unsaturated carboxylic acid monomer include the same monomers as those mentioned above for the latex of the carboxyl group-containing nitrile rubber (a1). The proportion of other monomer units formed by the other ethylenically unsaturated monomers in the carboxyl group-containing conjugated diene rubber (a3) is preferably 10 wt % or less, more preferably 5 wt % or less, still more preferably 3 wt % or less.

The latex of the carboxylic group-containing conjugated diene rubber (a3) used in the present invention can be obtained by copolymerizing a monomer mixture containing the above-mentioned monomers, and the monomers are preferably emulsion polymerized. The same emulsion polymerization method as that for the carboxyl group-containing nitrile rubber (a1) may be carried out using the same polymerization additives as those for the carboxyl group-containing nitrile rubber (a1).

An anti-aging agent, a preservative, an antibacterial agent, a dispersing agent, and the like may be optionally added to the latex of the carboxylic group-containing conjugated diene rubber (a3) used in the present invention.

The number average particle size of the latex of the carboxylic group-containing conjugated diene rubber (a3) used in the present invention is preferably 60 to 300 nm, more preferably 80 to 150 nm. The particle size can be adjusted to a desired value, for example, by selecting the amounts of emulsifier and polymerization initiator to be used.

Besides the latex of the carboxyl group-containing conjugated diene-based rubber (A), the latex composition used in the present invention also contains a water-soluble metal compound (B). In the latex composition used in the present invention, the water-soluble metal compound (B) acts as a cross-linking agent.

The present invention uses the water-soluble metal compound (B) as an alternative cross-linking agent to sulfur, which is a cross-linking agent commonly used, and additionally does not require any sulfur-containing vulcanization accelerator during cross-linking. For this reason, the present invention is effective in avoiding delayed (Type IV) allergic reactions due to sulfur and sulfur-containing vulcanization accelerators in addition to immediate (Type I) allergic reactions.

The water-soluble metal compound (B) may be any compound that contains a metal and is soluble in water. Examples thereof include, but are not limited to, sodium compounds, potassium compounds, lithium compounds, calcium compounds, magnesium compounds, aluminum compounds, cobalt compounds, and the like. Among these, preferred are water-soluble metal compounds containing a metal with a valency of 3 or more such as aluminum compounds and cobalt compounds because they allow the carboxyl group-containing conjugated diene-based rubber (A) in the latex to be cross-linked more successfully. More preferred are aluminum compounds.

Examples of such aluminum compounds include, but are not limited to, aluminum hydroxide, aluminum nitrate, aluminum sulfate, ammonium aluminum sulfate, aluminum bromide, aluminum fluoride, aluminum potassium sulfate, aluminum isopropoxide, sodium aluminate, potassium aluminate, sodium aluminum sulfite, and the like. These aluminum compounds may be used alone or in combination. Among these, sodium aluminate is preferably used to further enhance the effects of the present invention.

In the latex composition used in the present invention, the water-soluble metal compound (B) is present in an amount of 0.1 to 1.5 parts by weight, preferably 0.1 to 1.25 parts by weight, more preferably 0.1 to 1.0 part by weight relative to 100 parts by weight of the carboxyl group-containing conjugated diene-based rubber (A) in the latex. Control of the amount of the water-soluble metal compound (B) within the above ranges ensures favorable stability of the latex composition, and therefore allows the latex composition to be cross-linked sufficiently while effectively preventing the formation of agglomerates in the latex composition. As a result, a molded film such as a dip-molded article having further enhanced tensile strength and stress retention can be obtained.

Besides the latex of the carboxyl group-containing conjugated diene-based rubber (A) and the water-soluble metal compound (B) described above, the latex composition used in the present invention may further contain at least one alcoholic hydroxyl group-containing compound (C) selected from a saccharide (c1), a sugar alcohol (c2), a hydroxy acid (c3), and a hydroxy acid salt (c4). The additional presence of the alcoholic hydroxyl group-containing compound (C) further enhances the stability of the latex composition.

The saccharide (c1) may be any monosaccharide or polysaccharide in which two or more monosaccharides are bound by a glycosidic bond. Examples thereof include, but are not limited to, monosaccharides such as erythrose, threose, ribose, lyxose, xylose, arabinose, allose, talose, gulose, altrose, galactose, idose, erythrulose, xylulose, ribulose, psicose, fructose, sorbose, and tagatose; disaccharides such as trehalose, maltose, isomaltose, cellobiose, gentiobiose, melibiose, lactose, sucrose, and palatinose; trisaccharides such as maltotriose, isomaltotriose, panose, cellotriose, manninotriose, solatriose, melezitose, planteose, gentianose, umbelliferose, lactosucrose, and raffinose; homo-oligosaccharides such as maltotetraose and isomaltotetraose; tetrasaccharides such as stachyose, cellotetraose, scorodose, lyquinose, and panose; pentasaccharides such as maltopentaose and ismaltopentaose; hexasaccharides such as maltohexaose and isomaltotetraose; and the like. These may be used alone or in combination.

The sugar alcohol (c2) may be any mono- or polysaccharide alcohol. Examples thereof include, but are not limited to, tritols such as glycerin; tetritols such as erythritol, D-threitol, and L-threitol; pentitols such as D-arabinitol, L-arabinitol, xylitol, ribitol, and pentaerythritol; pentaerythritol; hexitols such as sorbitol, D-iditol, galactitol, D-glucitol, and mannitol; heptitols such as volemitol and perseitol; octitols such as D-erythro-D-galacto-octitol; and the like. These may be used alone or in combination. Among these, preferred are hexitols, which are sugar alcohols having 6 carbon atoms, and more preferred is sorbitol.

The hydroxy acid (c3) may be any carboxylic acid having a hydroxyl group. Examples thereof include, but are not limited to, aliphatic hydroxy acids such as glycolic acid, lactic acid, tartronic acid, glyceric acid, 2-hydroxybutyric acid, 3-hydroxybutyric acid, γ-hydroxy butyric acid, malic acid, 3-methylmalic acid, tartaric acid, citramalic acid, citric acid, isocitric acid, leucinic acid, mevalonic acid, pantoic acid, ricinoleic acid, ricinelaidic acid, cerebronic acid, quinic acid, shikimic acid, and serine; aromatic hydroxy acids such as monohydroxybenzoic acid derivatives including salicylic acid, creosote acid (homosalicylic acid, hydroxy (methyl)benzoic acid), vanillic acid, sillic acid, hydroxypropanoic acid, hydroxypentanoic acid, hydroxyhexanoic acid, hydroxyheptanoic acid, hydroxyoctanoic acid, hydroxynonanoic acid, hydroxydecanoic acid, hydroxyundecanoic acid, hydroxydododecanoic acid, hydroxytridecanoic acid, hydroxytetradecanoic acid, hydroxypentadecanoic acid, hydroxyheptadecanoic acid, hydroxyoctadecanoic acid, hydroxynonadecanoic acid, hydroxyicosanoic acid, and ricinoleic acid, dihydroxybenzoic acid derivatives including pyrocatechuic acid, resorcylic acid, protocatechuic acid, gentisic acid, and orthophosphoric acid, trihydroxybenzoic acid derivatives including gallic acid, phenylacetic acid derivatives including mandelic acid, benzilic acid, and atorlactic acid, and cinnamic acid/hydrocinnamic acid derivatives including melilotic acid, phloretic acid, coumaric acid, umbellic acid, caffeic acid, ferulic acid, and sinapinic acid; and the like. These may be used alone or in combination. Among these, preferred are aliphatic hydroxy acids, more preferred are aliphatic α-hydroxy acids, still more preferred are glycolic acid, lactic acid, tartronic acid, glyceric acid, malic acid, tartaric acid, and citric acid, and particularly preferred is glycolic acid.

The hydroxy acid salt (c4) may be any hydroxy acid salt. Examples thereof include, but are not limited to, metal salts of the hydroxy acids exemplified for the hydroxy acid (c3). Specific examples include salts of alkali metals such as sodium and potassium; and salts of alkaline earth metals such as calcium and magnesium. The hydroxy acid salt (c4) may include only one of these or may include a combination thereof. The hydroxy acid salt (c4) is preferably an alkali metal salt of a hydroxy acid, more preferably a sodium salt of a hydroxy acid. Further, the hydroxy acid constituting the hydroxy acid salt (c4) is preferably an aliphatic hydroxy acid, more preferably an aliphatic α-hydroxy acid, even more preferably glycolic acid, lactic acid, tartronic acid, glyceric acid, malic acid, tartaric acid, or citric acid, particularly preferably glycolic acid. In other words, the hydroxy acid salt (c4) is particularly preferably sodium glycolate.

In the latex composition used in the present invention, the alcoholic hydroxyl group-containing compound (C) is present in an amount which gives a weight ratio "water-soluble metal compound (B):alcoholic hydroxyl group-containing compound (C)" relative to the water-soluble metal compound (B) within the range of preferably 1:0.1 to 1:50, more preferably 1:0.2 to 1:45, still more preferably 1:0.3 to 1:30. The presence of the alcoholic hydroxyl group-containing compound (C) at a ratio controlled as described above more appropriately enhances the stability of the latex composition.

For example, the latex composition used in the present invention can be obtained by adding the water-soluble metal compound (B) and the optional alcoholic hydroxyl group-containing compound (C) to the latex of the carboxyl group-containing conjugated diene-based rubber (A). Although the water-soluble metal compound (B) may be added to the latex of the carboxyl group-containing conjugated diene-based rubber (A) in any manner, in order to prepare a latex composition in which the water-soluble metal compound (B) is dispersed well, it is preferred that the water-soluble metal compound (B) be dissolved in water or an alcohol and added as an aqueous or alcohol solution. Additionally, in the case of using the alcoholic hydroxyl group-containing compound (C), it is preferred that the water-soluble metal compound (B) and the alcoholic hydroxyl group-containing compound (C) be dissolved in water or an alcohol and added as an aqueous or alcohol solution to allow the water-soluble metal compound (B) to be dispersed more finely in the resulting latex composition.

Besides the latex of the carboxyl group-containing conjugated diene-based rubber (A), the water-soluble metal compound (B), and the optional alcoholic hydroxyl group-containing compound (C), additives such as a filler, a pH modifier, a thickening agent, an anti-aging agent, a dispersing agent, a pigment, and a softening agent may be added to the latex composition used in the present invention.

The solids content of the latex composition used in the present invention is preferably 10 to 40 wt %, more preferably 15 to 35 wt %. In other words, the moisture content of the latex composition used in the present invention is preferably 60 to 90 wt %, more preferably 65 to 85 wt %. The pH of the latex composition used in the present invention is preferably 8.0 to 12, more preferably 8.5 to 11.

Method for Producing Dip-Molded Article

The following section provides a description of the method for producing a dip-molded article according to the present invention.

The method for producing a dip-molded article according to the present invention comprises:

a dip-molding step of dip-molding a latex composition containing the latex of the carboxyl group-containing conjugated diene-based rubber (A) and the water-soluble metal compound (B) using a dip mold to form a dip-molded layer on the surface of the dip mold;

a moisture content adjustment step of adjusting the moisture content of the dip-molded layer famed on the surface of the dip mold to 1 to 30 wt %; and a beading step of performing beading after the adjusting of the moisture content, the beading including peeling a portion of the dip-molded layer famed on the surface of the dip mold from the dip mold.

<Dip-Molding Step>

The dip-molding step in the production method according to the present invention is a step of dip-molding a latex composition containing the latex of the carboxyl group-containing conjugated diene-based rubber (A) and the water-soluble metal compound (B) using a dip mold to form a dip-molded layer on the surface of the dip mold.

Although not particularly limited, a suitable dip-molding method involves immersing the dip mold in the latex composition to deposit the composition on the surface of the dip mold; and then pulling the dip mold from the latex composition. The dip mold may be pre-heated before immersion in the latex composition.

In the dip-molding step, a coagulant may be optionally used before immersing the dip mold in the latex composition or after pulling the dip mold from the latex composition. Specific examples of how to use the coagulant include immersing the dip mold in a coagulant solution before immersion in the latex composition to deposit the coagulant on the dip mold (anode coagulant dipping); immersing the dip mold with a deposition of the latex composition in a coagulant solution (Teague coagulant dipping); and the like. Preferred is anode coagulant dipping because a dip-molded article having a more uniform thickness can be obtained.

Examples of the coagulant include metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; sulfates such as calcium sulfate, magnesium sulfate, and aluminum sulfate; and the like. Among these, calcium chloride and calcium nitrate are preferred.

The coagulant is usually used as a solution in water, an alcohol, or a mixture thereof. The coagulant concentration is usually 5 to 50 wt %, preferably 10 to 35 wt %.

<Moisture Content Adjustment Step>

The moisture content adjustment step in the production method according to the present invention is a step of adjusting the moisture content of the dip-molded layer famed on the surface of the dip mold in the above dip-molding step to 1 to 30 wt %.

According to the production method according to the present invention, the moisture content of the dip-molded layer famed on the surface of the dip mold is adjusted to 1 to 30 wt %, and in the beading step (described below), the beading process of peeling a portion of the dip-molded layer from the dip mold is performed in the state where the moisture content of the dip-molded layer is controlled to 1 to 30 wt %. This enables the beading process to be completed successfully.

In particular, intensive studies by the present inventor revealed the following facts: Although delayed (Type IV) allergic reactions due to sulfur and sulfur-containing vulcanization accelerators as well as immediate (Type I) allergic reactions can be effectively avoided by using the above water-soluble metal compound (B) as a cross-linking agent in the latex composition, the beading process cannot be performed successfully, thereby resulting in a beading/rolling failure. On the other hand, control of the moisture content of the dip-molded layer within the range of 1 to 30 wt % reduces the adhesion strength between the dip-molded layer famed by dip-molding and the dip mold (e.g., reduces the peel strength to preferably 10 N or less, more preferably 8 N or less, still more preferably 4 N or less), and therefore enables the beading process to be completed successfully. As a result, the beading/rolling failure can be effectively prevented.

In the moisture content adjustment step, the moisture content of the dip-molded layer is adjusted to 1 to 30 wt %, preferably 1 to 25 wt %, more preferably 1 to 10 wt %. Too high a moisture content of the dip-molded layer can reduce the adhesion between the dip-molded layer and the dip mold, but results in insufficient strength of the dip-molded layer, and such a dip-molded layer may be torn during the beading/rolling operation. On the other hand, too low a moisture content of the dip-molded layer results in strong adhesion between the dip-molded layer and the dip mold and poor beading workability. The beading/rolling process cannot be performed on such a dip-molded layer.

In the moisture content adjustment step, a preferred method for adjusting the moisture content of the dip-molded layer within the above ranges is, but not limited to, heating the dip-molded layer to adjust the moisture content of the dip-molded layer. Specifically, the dip-molded layer is heated at preferably 20 to 100° C., more preferably 40 to 80° C., still more preferably 30 to 60° C. for preferably 1 to 20 minutes, more preferably 1 to 10 minutes, still more preferably 3 to 7 minutes.

The moisture content of the dip-molded layer can be measured in any manner. A preferable example thereof is a method involving precisely measuring the weight (G1) of the dip-molded layer, drying the dip-molded layer at 120° C. for 30 minutes to remove moisture therein, measuring the weight (G2) of the dip-molded layer after removal of moisture, and determining the moisture content from the measurements based on the following equation:

Moisture content (unit: wt %) of dip-molded layer=
[{weight (G1) of dip-molded layer before removal of moisture−weight (G2) of dip-molded layer after removal of moisture}/weight (G1) of dip-molded layer before removal of moisture]×100

<Beading Step>

The beading step in the present invention is a step of performing beading in which a portion of the dip-molded layer after adjustment of the moisture content in the moisture content adjustment step is peeled from the dip mold.

In the beading step, in the state where the moisture content of the dip-molded layer is controlled within 1 to 30 wt % as described above, the beading process (cuff rolling process) is performed in which a portion of the dip-molded layer famed on the surface of the dip mold is peeled from the dip mold. As described above, according to the production method according to the present invention, such a beading process can be successfully performed. Consequently, the beading/rolling failure can be effectively prevented.

In the production method according to the present invention, the beading process is a process in which before removing the dip-molded layer from the dip mold, a portion of the cuff portion of the dip-molded layer is peeled from the dip mold to form a demolding tab. In the cuff portion of the dip-molded layer, a portion with a width of preferably 10 to 50 mm, more preferably 20 to 30 mm is peeled such that the peeled portion is rolled. Such a beading process results in a dip-molded article which is resistant to tearing during use and is easy to put on when used as a glove, for example.

In the production method according to the present invention, before or after the beading process, the dip-molded layer may be immersed in water, preferably warm water at 30 to 70° C. for about 1 to 60 minutes to remove water-soluble impurities (for example, excess emulsifier, coagulant, and the like). The operation of removing such water-soluble impurities is preferably performed before the beading process. In this case, the water-soluble impurities can be more efficiently removed.

In the production method according to the present invention, the dip-molded layer after the beading process is cross-linked by heating, for example. The dip-molded layer is typically cross-linked by heating at 80 to 150° C. for preferably 10 to 130 minutes. Heating methods that can be used are external heating by infrared radiation or heated air and internal heating by high-frequency waves. Among these, external heating by heated air is preferred.

The cross-linked dip-molded layer is then removed from the dip mold. Thus, a dip-molded article is obtained. Removal methods that can be used are peeling of the dip-molded layer from the dip mold by hand; and peeling of the dip-molded layer by water pressure or pressure of compressed air. After removal from the mold, the dip-molded article may be further heated at 60 to 120° C. for 10 to 120 minutes.

The dip-molded article produced by the production method according to the present invention described above has a thickness of preferably 0.03 to 0.50 mm, more preferably 0.05 to 0.40 mm, particularly preferably 0.08 to 0.30 mm.

Since the dip-molded article produced by the production method according to the present invention is produced using the above-mentioned latex composition prepared by adding the water-soluble metal compound (B) as a cross-linking agent to the latex of the carboxyl group-containing conjugated diene-based rubber (A), the dip-molded article can avoid delayed (Type IV) allergic reactions in addition to immediate (Type I) allergic reactions, and barely fails beading/rolling. For this reason, the dip-molded article can be suitably used in applications in which the dip-molded article is used in contact with the human body and a beaded portion (rolled cuff portion) is desired, and is especially suited as gloves, in particular, surgical gloves. In addition to gloves, the dip-molded article according to the present invention can be used as medical supplies such as baby bottle teats, droppers, tubes, water pillows, balloon stalls, catheters, and condoms; toys such as air balls, dolls, and balls; industrial supplies such as pressure molding bags and gas storage bags; fingerstalls; and the like.

EXAMPLES

The present invention is hereinafter illustrated in more detail based on Examples, which should not be construed as limitations of the present invention. In the following examples, all "parts" are on a weight basis unless otherwise indicated. The tests and the evaluations were performed according to the following methods.

<Moisture Content of Dip-Molded Layer>

After adjustment of the moisture content, each of the dip-molded layers produced in Examples and Comparative Examples was measured for moisture as follows: Specifically, a portion of each dip-molded layer was sampled, and the weight (G1) of the dip-molded layer sample was precisely measured. Next, the dip-molded layer was heated at 120° C. for 30 minutes to remove moisture, thereby preparing a dip-molded layer after removal of moisture. The weight (G2) of the dip-molded layer after removal of moisture was then measured. The moisture content of the dip-molded layer was determined from the measurements based on the following equation:

Moisture content (unit: wt %) of dip-molded layer=
[{weight (G1) of dip-molded layer before
removal of moisture−weight (G2) of dip-
molded layer after removal of moisture}/weight
(G1) of dip-molded layer before removal of
moisture]×100

<Peel Strength Between Dip-Molded Layer and Glove Mold>

After adjustment of the moisture content and before removal from the glove mold, each of the dip-molded layers produced in Examples and Comparative Examples was subjected to a 180° peel test between the dip-molded layer and the glove mold using a universal tensile tester to measure the peel strength between the dip-molded layer and the glove mold. The peel rate was 500 mm/min. A smaller peel strength indicates weaker adhesion between the dip-molded layer and the glove mold, meaning easier beading (rolling) and better beading workability.

<Beading/Rolling Failure of Dip-Molded Layer>

After adjustment of the moisture content and before removal from the glove mold, each of the dip-molded layers produced in Examples and Comparative Examples was subjected to a beading/rolling operation of manually rolling an end portion of the dip-molded layer adhering to the glove mold. The evaluation was based on the following criteria:

No failure: the beading/rolling operation could be finished successfully by performing the rolling of the dip-molded layer five or less times.

Failure: the rolling of the dip-molded layer had to be performed six or more times to finish the beading/rolling operation successfully, or the beading/rolling operation completely failed.

Production Example 1 (Production of Latex of Carboxyl Group-Containing Nitrile Rubber (a1-1))

Into a pressure-resistant polymerization reactor equipped with a stirrer, 63 parts of 1,3-butadiene, 34 parts of acrylonitrile, 3 parts of methacrylic acid, 0.25 parts of t-dodecylmercaptan as a chain transfer agent, 132 parts of deionized water, 3 parts of sodium dodecylbenzenesulfonate, 1 part of β-naphthalene sulfonic acid formalin condensate sodium salt, 0.3 parts of potassium persulfate, and 0.005 parts of sodium ethylenediamine tetraacetate were placed, and the polymerization was started while maintaining the polymerization temperature at 37° C. When the polymerization conversion ratio reached 70%, the polymerization temperature was raised to 43° C., and the reaction was continued until the polymerization conversion ratio reached 95%. Thereafter, 0.1 parts of sodium dimethyldithiocarbamate as a polymerization terminator was added to stop the polymerization reaction. Next, from the resulting copolymer latex, unreacted monomers were removed by distillation under reduced pressure, and the solids content and the pH were then adjusted to obtain a latex of a carboxyl group-containing nitrile rubber (a1-1) having a solids content of 40 wt % and a pH of 8.0.

Example 1

<Preparation of Latex Composition>

First, a titanium dioxide dispersion was prepared by mixing 4.5 parts of titanium dioxide ($TiO_2$), 0.3 parts of β-naphthalene sulfonic acid formaldehyde condensate sodium salt, 0.0015 parts of potassium hydroxide, and 4.5 parts of water. In a mixing container, 250 parts (corresponding to 100 parts of the carboxyl group-containing nitrile rubber (a1-1)) of the latex of the carboxyl group-containing nitrile rubber (a1-1) prepared in Production Example 1 was combined with a mixed aqueous solution containing 0.5 parts of sodium aluminate, 0.75 parts of sorbitol, and 0.75 parts of sodium glycolate dissolved in water. To the resulting mixture was added the titanium dioxide dispersion prepared above in an amount corresponding to 1.5 parts of titanium dioxide relative to 100 parts of the carboxyl group-containing nitrile rubber (a1-1). Deionized water was then added to control the solids content to 30 wt %. Thus, a latex composition was prepared.

<Formation of Dip-Molded Layer>

An aqueous coagulant solution was prepared by mixing 30 parts of calcium nitrate, 0.05 parts of polyethylene glycol octylphenyl ether as a nonionic emulsifier, and 70 parts of water. Next, a ceramic glove mold (ceramic glove mold with a roughened surface) pre-heated to 70° C. was immersed in the coagulant aqueous solution for 5 seconds, and was then pulled out and dried at 70° C. for 10 minutes to form a deposit of the coagulant on the glove mold. Then, the glove mold with the deposit of the coagulant was immersed in the latex composition obtained above for 10 seconds, and was then pulled out and immersed in warm water at 50° C. for 90 seconds to cause water-soluble impurities to elute. Thus, a dip-molded layer was formed on the glove mold.

Next, before removal from the glove mold, the glove mold with the dip-molded layer formed thereon was dried at 60° C. for 5 minutes to adjust the moisture content of the dip-molded layer. The dip-molded layer after adjustment of the moisture content was measured for moisture content according to the method described above, and the moisture content was found to be 2.1 wt %. The dip-molded layer after adjustment of the moisture content thus prepared was examined according to the methods described above to measure the peel strength between the dip-molded layer and the glove mold and evaluate the beading/rolling failure of the dip-molded layer. The results are shown in Table 1.

Example 2

A dip-molded layer was famed on a glove mold in the same manner as in Example 1 using a latex composition prepared in the same manner as in Example 1. Before removal of the dip-molded layer from the glove mold, the glove mold with the dip-molded layer famed thereon was then dried at 30° C. for 5 minutes to adjust the moisture content of the dip-molded layer. The dip-molded layer after adjustment of the moisture content was measured for moisture content according to the method described above, and the moisture content was found to be 25 wt %. The dip-molded layer after adjustment of the moisture content thus prepared was examined according to the methods described above to measure the peel strength between the dip-molded layer and the glove mold and evaluate the beading/rolling failure of the dip-molded layer. The results are shown in Table 1.

Comparative Example 1

A dip-molded layer was famed on a glove mold in the same manner as in Example 1 using a latex composition prepared in the same manner as in Example 1. Before removal of the dip-molded layer from the glove mold, the glove mold with the dip-molded layer famed thereon was then dried at 15° C. for 5 minutes to adjust the moisture content of the dip-molded layer. The dip-molded layer after adjustment of the moisture content was measured for moisture content according to the method described above, and the moisture content was found to be 50 wt %. The dip-molded layer after adjustment of the moisture content thus prepared was examined according to the methods described above to measure the peel strength between the dip-molded layer and the glove mold and evaluate the beading/rolling failure of the dip-molded layer. The results are shown in Table 1.

Comparative Example 2

A dip-molded layer was famed on a glove mold in the same manner as in Example 1 using a latex composition prepared in the same manner as in Example 1. Before removal of the dip-molded layer from the glove mold, the glove mold with the dip-molded layer famed thereon was then dried at 125° C. for 5 minutes to adjust the moisture content of the dip-molded layer. The dip-molded layer after adjustment of the moisture content was measured for moisture content according to the method described above, and the moisture content was found to be 0 wt %. The dip-molded layer after adjustment of the moisture content thus prepared was examined according to the methods described above to measure the peel strength between the dip-molded layer and the glove mold and evaluate the beading/rolling failure of the dip-molded layer. The results are shown in Table 1.

TABLE 1

|  |  | Example 1 | Example 2 | Comparative Example 1 | Comparative Example 2 |
|---|---|---|---|---|---|
| Composition of latex composition |  |  |  |  |  |
| Carboxyl group-containing nitrile rubber | (parts) | 100 | 100 | 100 | 100 |
| Sodium aluminate | (parts) | 0.5 | 0.5 | 0.5 | 0.5 |
| Sorbitol | (parts) | 0.75 | 0.75 | 0.75 | 0.75 |
| Sodium glycolate | (parts) | 0.75 | 0.75 | 0.75 | 0.75 |
| Drying temperature | (° C.) | 60 | 30 | 15 | 125 |
| Drying time | (min) | 5 | 5 | 5 | 5 |
| Moisture content of dip-molded layer | (wt %) | 2.1 | 25 | 50 | 0 |
| Evaluations |  |  |  |  |  |
| Peel strength | (N) | 3.4 | 1.9 | 0.4 | 11.1 |
| Beading/rolling failure |  | No failure | No failure | Failure | Failure |

As shown in Table 1, in the examples where a dip-molded layer was famed by dip-molding a latex composition containing a latex of a carboxyl group-containing conjugated diene-based rubber (A) and a water-soluble metal compound (B) and the moisture content thereof was adjusted to 1 to 30 wt %, the adhesion to the dip mold could be reduced, and because of such reduced adhesion, the beading/rolling failure could be appropriately prevented (Examples 1 and 2). Additionally, dip-molded articles (rubber gloves) were obtained by cross-linking the dip-molded layers of Examples 1 and 2 after adjustment of the moisture content by heating at 125° C. for 25 minutes, and peeling the cross-linked dip-molded layers from the dip molds. The resulting dip-molded articles (rubber gloves) had sufficient strength and stress retention, suggesting that the dip-molded articles can be suitably used as rubber gloves.

In contrast, in the case where the moisture content of the dip-molded layer was higher than 30 wt %, although the adhesion to the dip mold could be reduced, the dip-molded layer had insufficient strength, and therefore was torn during the beading/rolling operation (Comparative Example 1).

The example where the moisture content of the dip-molded layer was less than 1 wt % resulted in a dip-molded layer having a high adhesion to the dip mold and poor beading workability, and the beading/rolling operation could not be performed (Comparative Example 2).

The invention claimed is:

1. A method for producing a dip-molded article, comprising:
    a dip-molding step of dip-molding a latex composition containing a latex of a carboxyl group-containing conjugated diene-based rubber (A), a water-soluble metal compound (B), and an alcoholic hydroxyl group-containing compound (C), wherein the alcoholic hydroxyl group-containing compound (C) comprises both a sugar alcohol (c2) and a hydroxy acid salt (c4), using a dip mold to form a dip-molded layer adhering to the dip mold on the surface of the dip mold;
    a moisture content adjustment step of heating the dip-molded layer adhering to the dip mold at 20 to 80° C. for 1 to 20 minutes to adjust the moisture content of the dip-molded layer adhering to the dip mold to 1 to 30 wt %; and
    a beading step of performing beading after the adjusting of the moisture content, the beading including peeling a portion of the dip-molded layer adhering to the dip mold in a state where the moisture content of the dip-molded layer is controlled to 1 to 30 wt %, wherein
    the hydroxy acid of the hydroxy acid salt (c4) is selected from the group consisting of glycolic acid, lactic acid, tartronic acid, glyceric acid, malic acid, tartaric acid, and citric acid, and
    a weight ratio of an amount of the water-soluble metal compound (B) to an amount of the alcoholic hydroxyl group-containing compound (C) in the latex composition is 1:0.1 to 1:50, where the amount of the alcoholic hydroxyl group-containing compound (C) is a total amount of an amount of the sugar alcohol (c2) and an amount of the hydroxy acid salt (c4), together with an amount of a saccharide (c1) and/or an amount of a hydroxy acid (c3) optionally present in the latex composition as additional alcoholic hydroxyl group-containing compound (C).

2. The method for producing a dip-molded article according to claim 1, further comprising:
    a cross-linking step of cross-linking the dip-molded layer after the beading; and
    a demolding step of removing the cross-linked dip-molded layer from the dip mold.

3. The method for producing a dip-molded article according to claim 2,
    wherein in the cross-linking step, the dip-molded layer is cross-linked by heating at 80 to 150° C. for 10 to 130 minutes.

4. The method for producing a dip-molded article according to claim 1,
    wherein the moisture content adjustment step includes a step of heating the dip-molded layer formed on the surface of the dip mold at 40 to 80° C. for 1 to 20 minutes.

5. The method for producing a dip-molded article according to claim 1,
    wherein the metal compound (B) is an aluminum compound.

6. The method for producing a dip-molded article according to claim 1, further comprising:
an immersing step of immersing the dip-molded layer adhering to the dip mold in water before the beading step.

7. The method for producing a dip-molded article according to claim 6,
wherein the immersing step is a step of immersing the dip-molded layer adhering to the dip mold in water at 30 to 70° C. for 1 to 60 minutes before the beading step.

8. The method for producing a dip-molded article according to claim 1,
wherein the carboxyl group-containing conjugated diene-based rubber (A) is at least one selected from a carboxyl group-containing nitrile rubber (a1), a carboxyl group-containing styrene-butadiene rubber (a2), or a carboxyl group-containing conjugated diene rubber (a3).

9. The method for producing a dip-molded article according to claim 1,
wherein the metal compound (B) is sodium aluminate.

10. The method for producing a dip-molded article according to claim 1,
wherein the amount of the water-soluble metal compound (B) is 0.1 to 1.5 parts by weight relative to 100 parts by weight of the carboxyl group-containing conjugated diene-based rubber (A) in the latex.

11. The method for producing a dip-molded article according to claim 1,
wherein the thickness of the dip-molded article is 0.03 to 0.50 mm.

12. The method for producing a dip-molded article according to claim 1,
wherein the sugar alcohol (c2) is a hexitol.

13. The method for producing a dip-molded article according to claim 1,
wherein the hydroxy acid salt (c4) is an alkali metal salt of the hydroxy acid.

14. The method for producing a dip-molded article according to claim 1,
wherein the hydroxy acid of the hydroxy acid salt (c4) is glycolic acid.

15. The method for producing a dip-molded article according to claim 1,
wherein the hydroxy acid of the hydroxy acid salt (c4) is selected from the group consisting of glycolic acid, tartronic acid, glyceric acid, malic acid, and tartaric acid.

* * * * *